United States Patent [19]

Morris

[11] Patent Number: 5,793,843

[45] Date of Patent: Aug. 11, 1998

[54] METHOD AND APPARATUS FOR TRANSMISSION OF DATA AND VOICE

[75] Inventor: Walker C. Morris, Dallas County, Tex.

[73] Assignee: Intelligence Technology Corporation, Dallas, Tex.

[21] Appl. No.: 314,533

[22] Filed: Sep. 28, 1994

Related U.S. Application Data

[63] Continuation of Ser. No. 828,527, Jan. 28, 1992, abandoned, which is a continuation-in-part of Ser. No. 733,826, Jul. 22, 1991, abandoned, which is a continuation-in-part of Ser. No. 429,356, Oct. 31, 1989, abandoned.

[51] Int. Cl.$^6$ .......................... H04M 11/00; H04M 1/00; H04Q 7/00; H04B 1/00

[52] U.S. Cl. .................... 379/59; 379/93; 379/97; 379/98; 379/100; 379/420; 455/33.1; 455/54.1

[58] Field of Search ...................... 379/58, 59, 61, 379/93, 97, 98, 100, 420; 370/94.1, 94.2, 91, 95.1, 100.1; 455/33.1, 54.1

[56] References Cited

U.S. PATENT DOCUMENTS

| | | | |
|---|---|---|---|
| 4,156,867 | 5/1979 | Bench et al. | 455/54.1 |
| 4,654,867 | 3/1987 | Labedz et al. | 379/59 |
| 4,697,281 | 9/1987 | O'Sullivan | 455/33.1 |
| 4,912,705 | 3/1990 | Paneth et al. | 370/100.1 |
| 4,912,756 | 3/1990 | Hop | 379/59 |
| 4,972,457 | 11/1990 | O'Sullivan | 379/59 |
| 5,016,115 | 5/1991 | Calkins | 379/100 |

*Primary Examiner*—Stephen Chin
*Assistant Examiner*—Vijay Shankar
*Attorney, Agent, or Firm*—W. Thomas Timmons; Timmons & Kelly

[57] ABSTRACT

A modem-controller for auto switching and controlling the transmission and receiving of voice and error-free transmission of standard data signals, fax data signals and voice communications over telephone line service, radio frequency networks, satellite systems, as well as cellular telephone systems includes analog switches that receive control signals from the micro-controller for controlling and switching the audio or data path of an internal voice board and the analog signals from a modem to and from a radio frequency transceiver via a radio frequency transceiver interface/logic board, a cellular telephone transceiver via a cellular telephone transceiver interface, a telephone landline via a data access arrangement (DAA), a satellite system via a telephone landline through the DAA. A method selects the DAA which either connects to the telephone line, the satellite system or the cellular telephone, and another method bypasses the DAA, selects and controls radio frequency telemetry modules or packet radios. The operation of the modem-controller is divided into three modes comprising a command mode, a data mode and an escape mode. The software is a set of data communication protocols which provide error-free communication of data and define a file transfer protocol at the application layer, the session protocol and the link protocol.

22 Claims, 4 Drawing Sheets

METHOD AND APPARATUS FOR TRANSMISSION OF DATA AND VOICE

This application is a File Wrapper Continuation of utility application Ser. No. 07/828,527 filed on Jan. 28, 1992, now abandoned, which was a Continuation-in-Part of utility application Ser. No. 07/733,826 filed Jul. 22, 1991, now abandoned, which was a Continuation-in-Part of utility application Ser. No. 07/429,356 filed Oct. 31, 1989, now abandoned.

TECHNICAL FIELD

The present invention relates in general to the control, transmission and reception of standard data, fax data and voice signals. More particularly, but not by way of limitation, it relates to a distinct method and apparatus for the auto-selecting and auto-routing of either standard data, fax data or voice communication over a cellular telephone system, a radio frequency (RF) network, a satellite system or telephone line service or a combination of communication services.

BACKGROUND ART

In recent years, with the increased emphasis on and use of portable or laptop computers and the availability of the cellular telephone system, radio frequency networks and satellite systems, more and more people are finding the need for, and the desirability of combining the portable or laptop computer with radio frequency networks, cellular telephone systems, satellite systems and conventional telephone line service to not only send and receive voice signals but to send and receive digital standard data and fax data between remote sites.

It is well known to send digital standard data or information over telephone lines from one to another by the use of conventional telephone line type modems. The conventional telephone line type modem is not reliable over cellular telephone systems, radio frequency networks or satellite systems.

There are other error-correcting modems able to send and receive standard data over cellular telephone systems, and other modems able to send and receive standard data over radio frequency networks, and other modems able to send and receive standard data over satellite systems, but none have the capabilities to work with all four; telephone line service, radio frequency networks, satellite systems and cellular telephone systems.

One modem that connects to a computer and a cellular phone is able to send and receive standard data over cellular and land line telephone systems; the Bridge modem. It will not communicate to a conventional telephone line type of modem, but using the Bridge's host modem; the Span modem, connected to a computer and a telephone line, the Bridge modem is able to achieve error-free standard data communication over cellular telephone systems. It is rated at 1200 bps, but with the overhead of it's proprietary error correcting scheme, the throughput of the Bridge is no more than 80%. The Span modem, if it is manually switched to non-cellular mode, will work with a conventional telephone line type of modem via telephone line; but the Span modem, connected to a computer and a telephone line, is unable to distinguish or auto switch from a cellular incoming Bridge call or an incoming conventional telephone line type of modem call. This makes the Span modem unsuitable as a host type of modem where you have incoming cellular and conventional telephone line type modem calls. Two separate modems, a Span modem and a conventional telephone line type of modem on two separate telephone lines would have to be used to handle this situation. The Bridge or Span modems do not support voice or fax communication over wireless radio frequency telemetry modules, packet radios, satellite systems or telephone line communications.

The standard data communications discussed above is the serial type of standard data communications which has two different forms, namely synchronous and asynchronous.

Synchronous communication requires the use of a common clock between the communication systems. Compared to asynchronous communication, synchronous communication is faster, but is also requires more complex controlling software as well as hardware for it to properly transmit and receive standard data. One of the primary applications of synchronous communication is in high-speed computer-to-computer or DTE to DTE communications.

Asynchronous communication does not require a common clock between the two communication systems; thus, the two systems are not synchronized with each other. Instead of sharing a common clock, each system has its own clock, which, in order to communicate properly, must be very close to the clock rate of the other system. Because there is no common synchronizing clock between asynchronous systems, they are limited to slower speeds. Modems used by the personal computer owner are typically asynchronous.

During the transfer or sending of large amounts of digital data (such as a standard file transfer or fax), it is important that errors do not occur and if they do occur it is important to discover and correct any such errors in the data.

The solution to the problem is to have communications software monitor the accuracy of the transferred standard or fax data and request that standard or fax data be sent again when errors are detected. Software techniques for doing this are called protocols. The error detection and correction procedure allows for the detection of and orderly recovery from errors caused by factors outside the control of the computer at either end. Signal quality deterioration, interference or noise, hand-off, and loss of carrier are some of the primary problems in the transfer of standard or fax data over rural telephone lines, cellular telephone systems, satellite systems and radio frequency networks.

There is a need to be able to have voice communication and error-free transmission of digital standard and fax data over cellular telephone systems, telephone line service, satellite systems and radio frequency networks from a remote type of DTE to a host type DTE connected to a telephone line type of modem-controller capable of distinguishing and auto switching from an incoming cellular call, conventional telephone line call, satellite system call, or radio frequency call and to transmit and receive at a rate higher than 1200 baud.

U.S. Pat. No. 4,456,793 to Baker et al. shows a computer with an optical link and an optical transceiver mounted in a ceiling or other high place.

DISCLOSURE OF THE INVENTION

A method and apparatus (modem-controller) for auto switching and controlling the transmission and receiving of voice and error-free transmission of standard data signals, fax data signals and voice communications over telephone line service, radio frequency networks, satellite systems, as well as cellular telephone systems is provided and is operatively connected to computers or other types of DTE, a method to select a data access arrangement (DAA) which either connects to a telephone line, satellite system or a cellular telephone, and another method to bypass the DAA and select and control radio frequency telemetry modules or packet radios. The apparatus includes analog switches that receive control signals from the micro-controller for controlling and switching the audio or data path of the internal voice board and the analog signals from the data pump to and from a radio frequency transceiver via the radio frequency transceiver interface/logic board, a cellular telephone transceiver via the cellular telephone transceiver interface, a telephone landline via a data DAA, a satellite system via a telephone landline through the DAA. Therefore, voice signals from the voice board, standard data or fax data from a computer or other type of DTE device can be sent over telephone landlines, wireless radio frequency networks, satellite system networks, cellular telephone system networks and infrared transmission.

With reference to the software implementation, the operation of modem-controller is divided into three modes; comprising a command mode, a data mode and an escape mode. Therefore, the software is based upon the three modes of operation.

In order to eliminate standard or fax data errors that may occur during signal quality deterioration, interference, noise, hand-off, and loss of carrier using dirty or poor quality conventional telephone line service, radio frequency networks, satellite systems and cellular telephone systems, the ITC-RM was developed. The ITC Reliable Mode (ITC-RM) enhances and fine tunes Microcom Networking Protocol (MNP) levels 2, 3, 4 and 5. ITC-RM is programmed in the modem BIOS in an erasable programmable read only memory (EPROM) 16 for modem-controller 120.

Microcom Networking Protocol is a set of data communication protocols which provide error correction and data compression services in communication devices like modems over conventional telephone lines. MNP classes 2-4, are for error correction and synchronous data transmission and are in the public domain. Microcom Networking Protocol (MNP) class 5, used for data compression, is licensed by ITC from Microcom.

Among the unique advantages offered by the present invention installed in remote computer or DTE is the ITC-Reliable Mode. The ITC-RM enhances and fine tunes MNP for users who require fast, reliable and error-free standard data or fax data transmission over particularly poor lines, such as conventional rural telephone lines, radio frequency networks, satellite systems and cellular telephone systems. The present invention installed in a host computer or DTE is able to distinguish and auto switch from cellular incoming calls, radio frequency calls, satellite incoming calls or incoming conventional telephone line type of modem calls. The present invention installed in a remote computer or DTE communicating to the present invention installed in another remote or host computer or DTE via telephone line service, cellular telephone systems, satellite systems or radio frequency networks is able to transmit and receive standard data and fax data at a rate up to and exceeding 9600 bps.

The invention may be installed internally in computers or other type of DTE to communicate over a cellular telephone system, a radio frequency network, a satellite system or telephone line service with other computers or other type of DTE.

Also, an external version of the invention can be connected to computers or other type of DTE via serial ports to communicate over a cellular telephone system, a radio frequency network, a satellite system or telephone line service with other computers or other type of DTE.

More particularly, but not by way of limitation, using an enhanced and fine tuned version of MNP such as ITC-RM, the present invention relates to a method and apparatus for transmission of standard data and fax data over a cellular telephone system, radio frequency network, satellite system or a telephone line service with emphasis upon the error-free transmission and reception of standard data and fax data in an error correcting mode. In one arrangement, the invention includes infrared transmission capability connected to the computer through the modem-controller.

The present invention also supports a mode of operation or control that allows an external telephone device such as an external fax machine to interface via the telephone line jack to the cellular telephone interface and then to the cellular telephone transceiver to do wireless fax transmission over a cellular telephone system.

When either the radio frequency network, cellular telephone system, infrared, satellite system or a telephone line method of communication is used, the invention automatically switches to the selected method desired and connects to the proper service selected; radio frequency (RF), cellular, satellite or telephone line or a combination of phones or radios, for the correct protocol to enable error-free standard data or fax data and voice communication.

The invention is highly flexible, allowing the unit to support multiple protocols currently in use, and supporting future protocols like V.42 compliant error correction, V.42 bis data compression protocol, and MNP class 10 as they become available.

The invention supports standard data and fax data protocols compatible to Group 3 (G3) fax, CCITT V.22A/B and V.22 bis, V.23, V.29, V.27 ter, V.21 channel 2 recommendations, and Bell 212A and Bell 103 with auto-fallback. The invention also implements a fine tuned version of Microcom Networking Protocol (MNP) error correcting protocol and data compression classes 2, 3, 4, and 5 called the ITC Reliable Mode (ITC-RM), and operates in non-error-correction mode as well. This provides error-free standard or fax data communication over cellular systems, radio frequency networks, satellite system networks and telephone line service regardless of line quality.

The invention allows any computer or DTE to be an isolated communication device; when using a speakerphone and dialing telephone numbers, through the use of communication software, using a computer's or DTE's numeric keypad or numeric keys and can automatically dial or answer through communication software script files.

This invention is distinctive and unique in that it is not a modification or incorporation from existing apparatus. Until this present invention, there has not been one apparatus capable of the transfer of voice, standard data or fax data through radio frequency networks, cellular telephone systems, satellite systems, infrared apparatus and conventional telephone line service in an error-free environment.

Examples of the more important features and advantages of the invention have thus been summarized rather broadly in order that the following detailed description thereof may be better understood and in order that the contribution to the art may be better appreciated. There are, of course, additional features of the invention that will be described hereinafter and which will also form the subject of the claims appended hereto. Other features of the invention will become apparent with reference to the following detailed description of a presently preferred embodiment thereof in connection with the accompanying drawings, wherein like reference numerals have been applied to like elements in which:

BEST MODE FOR CARRYING OUT THE INVENTION

Figure 1A:
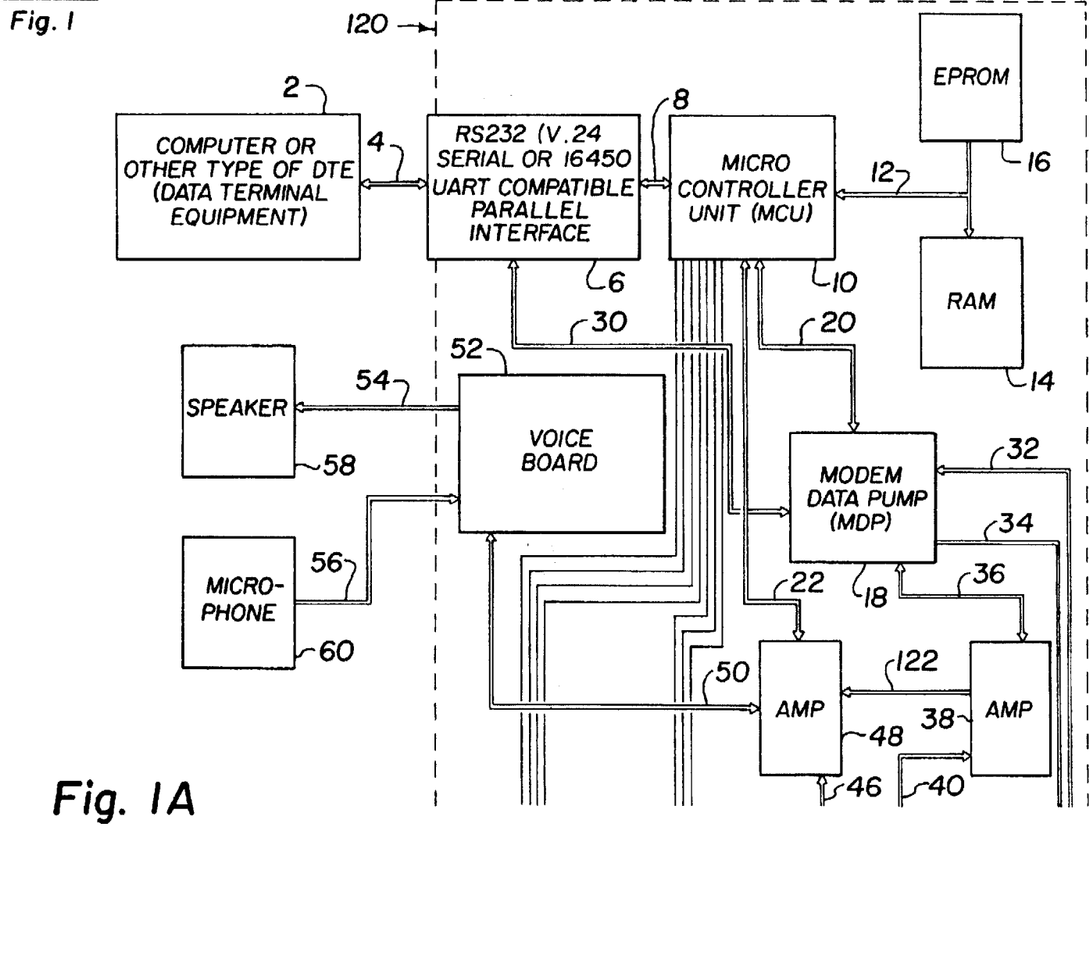
FIG. 1 is a simplified schematic, in block diagram form, of the preferred embodiment of the present invention.
Figure 1B:
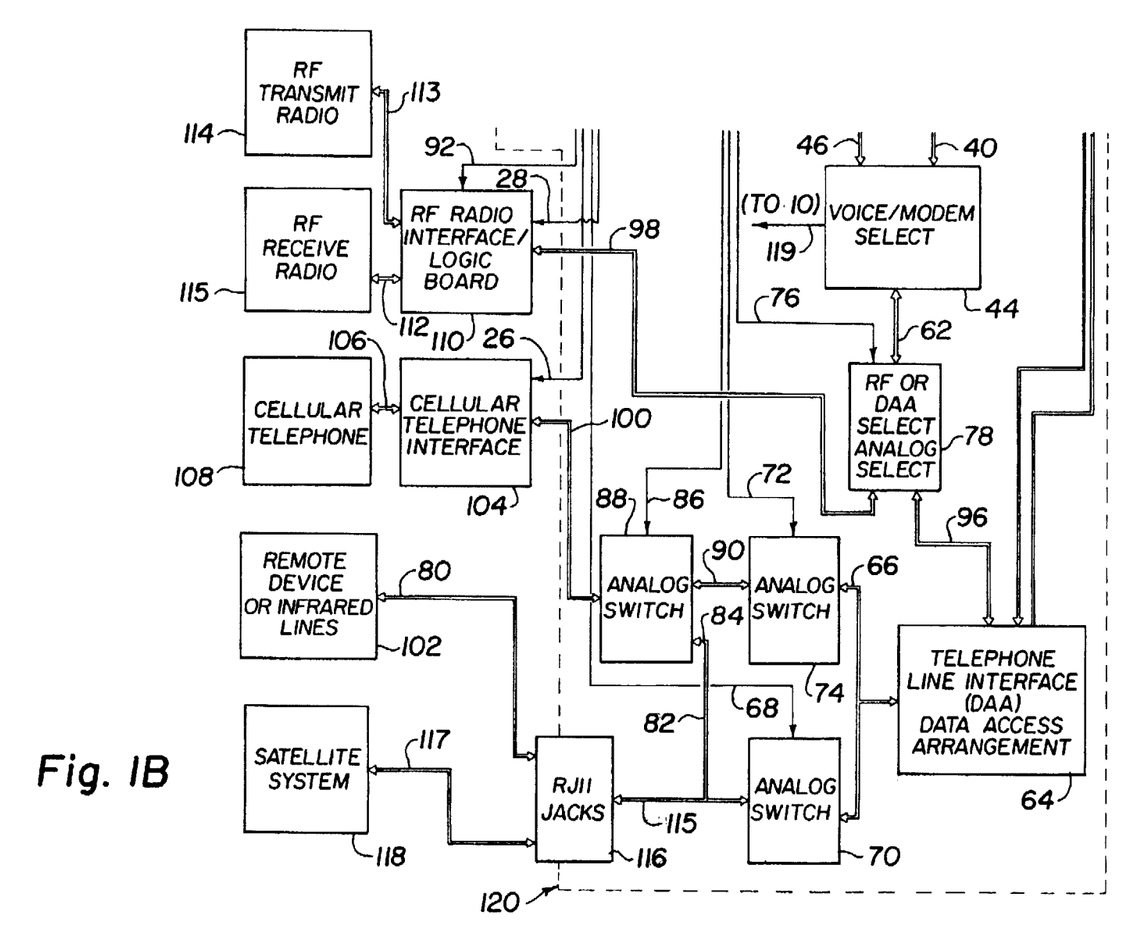

Referring to the drawing and to FIG. 1 in particular, shown therein and generally designated by the reference character 120, is a preferred embodiment of a modem-controller according to the present invention. Microcontroller 10 is a microprocessor which is employed as the controller for modem-controller 120. One static Random-Access Memory (RAM) 14 is added to the system to provide adequate working space for programming. An erasable programmable read only memory (EPROM) 16 is added to the system to provide enough ROM space for the firmware. RAM 14 and EPROM 16 are operatively connected to microcontroller 10 by data and address bus 12. Microcontroller 10 executes the firmware or modem BIOS stored in EPROM 16 and manipulates the data in RAM 14 through the data and address bus 12. A decoder in microcontroller 10 is used to decode the address bus to select RAM 14, EPROM 16 or data pump 18. Modem-controller 120 communicates with the DTE 2 through the RS232C interface 6 operatively connected to microcontroller 10. In the disclosed embodiment, DTE 2 is a computer or DTE. Ring indicator signal is sent to data pump chip 18 via bus 32.

Data pump chip 18 is operatively connected to microcontroller 10 by data and control bus 20. Data pump chip 18 is a 2400 baud, full duplex, data pump fax modem device set.

It includes a digital signal processor (DSP) and an integrated analog (IA) device. In addition to digital signal processing on the transmitted data, the DSP provides the interface to microcontroller 10 for information exchange and controlling. The IA chip functions like a digital to analog converter and an analog to digital converter to manipulate the signal to and from the DSP.

Modem-controller 120 is able to connect to the normal telephone line 80 through RJ11 jack 116 connected via bus 115 to data access arrangement (DAA) 64 interface and access, via telephone line(s) 80, remote device 102, such as another modem connected to a computer or other type of DTE or a Fax machine. Modem-controller 120 establishes the connection through a dialing process by specific AT commands from the keyboard of DTE 2. Although most of the applications of modem transmission involves dial-up lines, modem-controller 120 can also be connected to a leased (private) line. Under this condition, special line conditioning is not needed and the operation is full duplex over this leased line. In other words, there is not any dialing process required before connection to the leased line. The telephone line ring indication signal is transferred from the DAA 64 to modem chip 18 via bus 32 while the −OHRELAY, MUTE and −T/D RELAY signals are transferred to DAA 64 from modem chip 18 via bus 34.

When an incoming call is present, the ring indication signal is recognized by the Integrated Analog (IA) Device of modem chip 18 with appropriate control signals being sent to DAA 64 by modem chip 18. The assertion of the −OHRELAY signal causes an offhook (online) function to be performed. The −T/D RELAY signal controls when telephone line 80 is connected to RJ11 jacks 116 through bus 115 to DAA 64. MUTE is a signal controlled by microcontroller 10 to reduce the transient effects during offhook and onhook operations due to the on/off of the relay controlled by the −OHRELAY signal.

The switching or routing of standard or fax data or voice to radio frequency telemetry module or packet radio interface 110, DAA 64 to RJ11 jacks 115, or cellular telephone interface 104 is performed by analog switches 70, 74, 78 which may be comprised of analog multiplexer/demultiplexer chips. Analog switch 70 is controlled by the telephone line select (TL-SEL) signal from microcontroller 10 via bus 68. Analog switch 74 is controlled by cellular phone interface select (CPI-SEL) signal from microcontroller 10 via bus 72. Analog switch 78 is controlled by RF radio interface select (RFI-SEL) signal from microcontroller 10 via bus 76.

The auto switching between standard or fax data mode and voice mode is performed by analog switches 44 which may be comprised of a analog multiplexer/demultiplexer chip. Analog switch 44 is controlled by voice-or-data select (VORD-SEL) signal from microcontroller 10 via bus 42. This VORD-SEL signal from microcontroller 10 is controlled by a AT command suffix, alpha character "v", received from DTE 2 through bus 4, RS232C 6 and bus 8. If a dialing command is received by the microcontroller and it ends in the alpha character "v", a VORD-SEL signal will be sent to analog switch 44 to select the voice mode.

If a dialing command is received by microcontroller 10 and it does not have the alpha character "v" as a suffix, a VORD-SEL signal will be sent to analog switch 44 to select the standard or fax data mode. If analog switch 44 is in the standard or fax data select position, selected by microcontroller 10 VORD-SEL signal, analog switches 70, 74 and 78 allow the analog signals transmitted from and received by modem chip 18 to be routed either to RJ11 jacks 115 or cellular phone interface 104 via bus 36, amplifier 38, bus 40, analog switch 44, bus 62, analog switch 78, bus 96, DAA 64, and bus 66 or to radio frequency interface 110 via bus 36, amplifier 38, bus 40, analog switch 44, bus 62, analog switch 78, bus 98. If analog switch 44 is in the voice select position, selected by microcontroller 10 VORD-SEL signal, analog switches 70, 74 and 78 allow voice communication transmitted from and received by internal voice board 52 to be routed either to RJ11 jacks 116, radio frequency interface 110 and cellular phone interface 104 via external mike 60, bus 56, external speaker 58, bus 54, voice board 52, bus 50, amplifier 48, bus 46, analog switch 44, bus 62, analog switch 78, and either bus 96 to DAA 64, and bus 66 or bus 98 to radio frequency interface 110.

The present invention also supports another mode of operation or control. Another type of telephone device such as an external fax machine can interface via telephone line 80, RJ11 jacks 116, bus 115, bus 82, analog switch 88, bus 100 to the cellular phone interface 104, bus 106, and then to the cellular telephone 108 to do wireless external fax transmission over a cellular telephone system.

This mode is controlled by the microcontroller 10 and if the following conditions exist: A cellular telephone 108 is connected, their corresponding interface, cellular telephone interface 104 is switched on, and a telephone device is attached to the RJ11 jacks 116. The switching or routing of the telephone line 80 to the cellular phone interface 104 is performed by analog switches 88 which may be comprised of analog multiplexer/demultiplexer chips. Analog switch 88 is controlled by the CPI-SEL signal 72 and LL-SEL signal 68 from microcontroller 10 via bus 86.

In summary, different operations can be performed by different settings of the analog switches 44, 70, 74, 78, and 88 hence different routing of the signals.

When standard or fax data is being sent from or received at modem chip 18 on bus 40, the same signals are sent to amplifier 48 via bus 122. A mute signal is also sent to amplifier 48 from microcontroller 10 via bus 22. Amplifier 48 then outputs a mute signal on bus 50 to voice board 52 to disable speaker 58 during the transmission and receipt of standard or fax data from or to modem chip 18.

The cellular telephone 108 connected to modem-controller 120 is full duplex radio telephone for use in cellular telephone systems. It consists of an internal transmitter and receiver (transceiver) unit, keypad, display, antenna, mike and speaker. The cellular telephone provides full duplex synthesized FM radio channels for voice and standard or fax data transmission between the cell site base stations.

The design strategy of the cellular phone interface 104 is to provide a simulation of a telephone line tip and ring from a cellular telephone 108 for connection to DAA 64 of modem-controller 120. In other words, when cellular mode is selected by microcontroller 10, a interface through DAA 64 to cellular phone interface 104 and then cellular telephone 108 is made and voice and standard or fax data transmission through cellular telephone 108 is made like it is a ordinary telephone line.

The 800 MHz radio frequency packet radio 114 connected to modem-controller 120, when interfaced, is a half-duplex radio with synthesized frequency selection for operation in the 800 MHz band for transmitting and receiving and provides 3 watts of output power. Using two 800 MHz radio frequency packet radio modules 114 and 115, connected to modem-controller 120, full duplex operation is achieved.

The 800 MHz radio frequency telemetry module 114 connected to modem-controller 120, when interfaced, contains both a data transmitter and a data receiver (transceiver). It has manual or user programmable synthesized frequency selection for half-duplex operation on a single channel in the 806–824 MHz receive and 851–869 MHz transmit frequency range. The transmitter power output is 1 watts at 7.2 volts. It uses 25 kHz channel spacing. Using two 800 MHz radio frequency telemetry modules 114 and 115, connected to modem-controller 120, full duplex operation is achieved.

The 450 MHz radio frequency telemetry module 114 connected to modem-controller 120, when interfaced, contains both a data transmitter and a data receiver (transceiver). It has synthesized frequency selection for half-duplex operation on a single channel in the 450–480 MHz or 403–430 MHz transmit frequency range. The transmitter power output is 2 watts at 7.2 volts. It uses 25 kHz or optional 12.5 kHz minimum channel spacing. Using two 450 MHz radio frequency telemetry modules 114 and 115, connected to modem-controller 120, full duplex operation is achieved.

The design strategy of the radio frequency interface 110 is to provide an interface and the logic required by radio frequency 450 MHz or 800 MHz telemetry module(s) 114 and 115 or the 800 MHz packet radios 114 and 115 for connection to modem-controller 120. In other words, when radio frequency mode is selected by microcontroller 10, a interface through bus 98, RF radio interface/logic board 110, bus 112 and 113 and then to one or two (one for half duplex operation or two for full duplex operation) radio frequency telemetry module(s) or packet radio(s) 114 and 115 are made and voice and standard or fax data transmission through the telemetry module(s) or packet radio(s) 114 and 115 is accomplished.

The RS232C standard defines the interface between DTE 2 and microcontroller 10 and modem chip 18. Commands entered from DTE 2 is sent via RS232C cable 4, RS232C interface 6, and bus 30 by asynchronous transmission into serial port, bus 8 to microcontroller 10.

Modem-controller 120 contains a high performance 2400/9600 baud data pump that supports 9600 baud fax and 2400 baud standard data speeds and is designed such that it can be used for standard data or fax data transmission and receiving with ordinary telephone lines, radio frequency (RF), satellite systems and cellular systems. Unlike conventional modems, it does not provide any hardware jumpers or switch settings and thus eliminates the inconvenience of hardware jumpers or switch settings for ease of operation to non-technical users. Instead, the alteration of all functional features can be thoroughly accessed through AT commands and settings of S registers through communication software.

Modem-controller 120 is a Hayes compatible modem, including most of the AT commands implemented in Hayes Smartmodem except those commands for synchronous transmission and speaker control. In order to increase the efficiency, full-duplex operation is supported during communication. Modem-controller 120 can establish connection with various speeds such as 300 baud, 600 baud, 1200 baud, 2400 baud, 4800 baud (fax), 9600 baud (fax) under different communication protocols. Retrain sequence is automatically detected and sent to maintain proper communication environment between calling and answering modem during connection. Auto answer mode is activated by setting up the ring count value before connection.

Modem-controller 120 can establish the connection in either originate mode or answer mode directly selected by the software. Pulse and tone dialing are both supported in modem-controller 120 with software selection of the pulse and tone dialing format.

One of the unique features of modem-controller 120 is the capability of connection with a cellular telephone 108, satellite system radio, or a radio frequency telemetry module or packet radio 114. This enhances it's portability when installed in hand held, portable or lap-top computers or DTE (DTE). In addition to standard data or fax data transmission, modem-controller 120 provides the function for voice communication. Together with voice board 52, the user can establish voice conversation in a hands-free mode whether connected to telephone lines 80, satellite systems, radio frequency networks and cellular telephone systems 108.

In order to eliminate standard or fax data errors that may occur during signal quality deterioration, interference or noise, hand-off, and loss of carrier using dirty or poor quality conventional voice telephone lines, radio frequency networks, satellite systems, and cellular telephone systems, the ITC-RM was developed. The ITC-RM enhances and fine tunes MNP levels 2, 3, 4 and 5. ITC-RM is programmed in the modem BIOS or firmware in an EPROM 16 for modem-controller 120.

In the present invention, modem-controller 120 can be connected to a cellular telephone 108, satellite system, or a radio frequency telemetry module or packet radio 114. Carrier loss happens more frequently in wireless systems than in a ordinary telephone lines. The modem-controller, using ITC-RM, adapts to the unhealthy working environment of wireless systems by increasing the re-try count from two to six in the link phase. The link-up is first initiated at 2400 BAUD. If a 2400 BAUD link-up fails, the modem-controller, using the ITC Reliable Mode (ITC-RM), will down-shift to 1200 BAUD. After successful connection, the modem-controller, using the ITC Reliable Mode (ITC-RM), will set the packet re-try count to eighteen. During carrier loss, the modem-controller, using the ITC-RM, will temporarily suspend standard and fax data transmission to wait for the recovery of the carrier. If the carrier loss occurs in synchronous mode, the modem-controller, using the ITC-RM, will switch back to asynchronous mode until detection of the carrier occurs and will then switch back to synchronous mode. In other words, even if the carrier is lost, the modem-controller will not "hang up".

With reference to the software implementation, the operation of modem-controller 120 is divided into three modes comprising a command mode, a data (standard or fax) mode and an escape mode; therefore, the software is based upon the three modes of operation.

In the command mode, modem-controller 120 receives the input via the serial port through the RS232C interface 6. If the echo command is on (ATE1), the same character which is input will be fed back to the DTE 2.

Modem-controller 120 accepts the standard AT command set prefix 'AT' or 'A/' to repeat last command. If the input character is 'A', modem-controller 120 will wait for the typing of 'T' or '/'. If not received, modem-controller 120 will repeat the process for the next 'A'. After receiving a correct command prefix 'AT', modem-controller 120 will start to accept typing as AT command and will store them in the command buffer until a carriage return is entered. Modem-controller 120 will then process the commands in the command buffer and output corresponding messages to the DTE 2 via the serial port. If an incorrect command is sent, an error message will be displayed. On the other hand, modem-controller 120 will not wait for the input of a carriage return if 'A' is captured first. Instead, it will repeat the last entered command in the command buffer.

One of the smart features in the command mode is the capability of auto baud rate checking and auto format adjustment. This is established by the inspection of the AT command prefix 'AT' and 'A/'. At this stage, the reception of the prefix is done on bit manipulation instead of accepting the whole character through the serial port of the microcontroller 10. The start bit duration of the typed character is measured and hence the current communication baud rate is determined. According to the measured baud rate, the succeeding bits will be sampled and captured, also the input character is then found. If this is a character 'A', then the next character is captured in the same manner except that the duration of its start bit need not be measured again. If the next character is 'T' or '/', the process of auto baud rate check will then be completed.

The format of asynchronous communication protocol (parity bit, data bit, stop bit) is also determined during the capture of the command prefix. This is achieved by the sampling of bit 8 and bit 9 of the character 'A' and valid character 'T' or '/'. From the different combination of these bits, specific format of protocol is recognized. Afterward, the serial communication that follows will employ the serial port of the microcontroller 10 since the baud rate and format have been decided.

If there is an incoming call, the ring signal (ring indication) will be detected and a 'RING' message will be shown for each ring.

If the number of rings received is equal to the value stored in the S0 register or the 'ATA' command is entered, modem-controller 120 will connect the line to answer the coming call. It will then switch to standard or fax data mode for transmission.

To initiate a standard data call, the command 'ATD' is entered and then followed by the dialed number. Modem-controller 120 will check for the presence of a dial tone and then for a busy tone after completing the dialing process. At the end of the dialing process, modem-controller 120 will wait for the presence of the carrier within the time specified by the value in S7 register. If a carrier is detected and connection is successful, standard data mode is entered. Otherwise the call process is aborted.

To initiate a fax data call, a specialized fax software is employed that lets you simply enter a phone number to dial, be it stored or manual, and press a key to dial. All AT commands are in the background and not entered by the user. Modem-controller 120 will check for the presence of a dial tone and then for a busy tone after completing the dialing process. At the end of the dialing process, modem-controller 120 will wait for the presence of the carrier within the time specified by the value in S7 register set by the specialized fax software. If a carrier is detected, connection is successful, fax data mode is entered. Otherwise the call process is aborted.

To initiate a voice call, the command 'ATD' is entered, followed by the dialed number and the suffix 'v'. Modem-controller 120 will check for the presence of a dial tone and then for a busy tone after completing the dialing process. At the end of the dialing process, modem-controller 120 will wait for the calling party to answer and on answering, voice mode is entered. Otherwise the call process is aborted. The carrier tone is disabled in the voice mode.

Because modem-controller 120 employs ITC-RM, which enhances and fine tunes MNP levels 2, 3, 4 and 5 to eliminate standard data errors that may occur using dirty or poor quality conventional voice telephone lines, radio frequency networks, satellite systems and cellular telephone systems, there are two absolutely different modes (normal mode and the MNP) with ITC-RM selectable by the user. For the application of interfacing with a cellular telephone 108, satellite system 118, and the radio frequency telemetry module or packet radio 114 and 115, the enhanced MNP mode using ITC-RM is compulsory for maintaining proper operation due to the noisy environment and frequently lost carrier. The mode switching is automatically set to this compulsory setting of enhanced MNP mode using ITC-RM if either the radio frequency interface or cellular telephone interface is switched on or manually controlled by a set of particular AT commands (&E0, &E1, &E2) using communication software for landline and satellite system use.

In the normal mode and without activation of the enhanced MNP mode with ITC-RM, modem-controller 120 handles the data transmission as a conventional modem. It follows the CCITT or BELL recommendation to perform asynchronous transmission at 300, 600, 1200 or 2400 baud. The data flowing between the modems is on a character basis. No error detection and data compression is done using this mode.

In the MNP with ITC-RM, transmission is performed in units of data packets. The technique of handshaking is added to normal data transmission in order to achieve error elimination and protocol compatibility. There are different packets named Link Protocol Data Unit (LPDU) defined in MNP for specific purposes.

Each LPDU has its own information such as the sequence number and series number and a Cyclical Redundancy Check (CRC) checksum at the end of each LPDU.

During the connection phase, information exchange between the calling and called party rely on the transmission of LR LPDU and Link Acknowledgement packet (LA LPDU). Through this three way handshaking, a compromised operating environment will be established for both modem devices. Asynchronous transmission works on these packets. If MNP level three or above can be achieved after the Link phase, then synchronous mode will be selected for data transmission in SDLC frame structure with a view to the increase in efficiency. Otherwise, asynchronous mode will be kept unchanged as usual.

The error detection is done by comparing the calculated CRC with the actual CRC which is received for each packet. If errors occurs, an acknowledgement requesting the retransmission of the bad packets will be issued. Hence the enhanced MNP with ITC-RM can achieve excellent reliability for data communication over cellular telephone systems and radio frequency networks. A retransmission counter defines the maximum available attempts for retransmission. An inactivity timer keeps tract of the silence time (no information exchange) after the line is connected. If the above time limitation is violated, the transmission will be terminated at once thereby indicating that the current working environment is abnormal and hence the line should be disconnected.

In normal operation, the data packets will be sent in order by the sender modem according to their sequence number specified during transmission. For a successful receipt of a data packet (LD LPDU), the receiver must issue the positive acknowledgment to the sender to indicate the correct receipt of the packet. This is accomplished by placing the sequence number of the data packet in the LA LPDU packet. In order to alleviate the overhead caused by the frequently transmitted LA packet, the receive modem does not need to make an immediate response to each data packet received. Instead, it permits the delay of the transmission of LA packets within the extent of the window size (four data packets in the inventive protocol). The receive modem will send the sequence number of the latest good data packet received. As a result, all of the packets with sequence numbers earlier than that in the LA packet which is acknowledged are positively acknowledged by only one transmission of the LA packet.

If modem-controller 120 is operating in the escape mode, all the AT commands can be used. The typing of the escape sequence '+++' in the data mode will switch the modem-controller 120 to the escape mode for the access of AT commands. On the contrary, the command 'ATO' will bring the modem-controller back to the data (online) mode once again.

Figure 2:
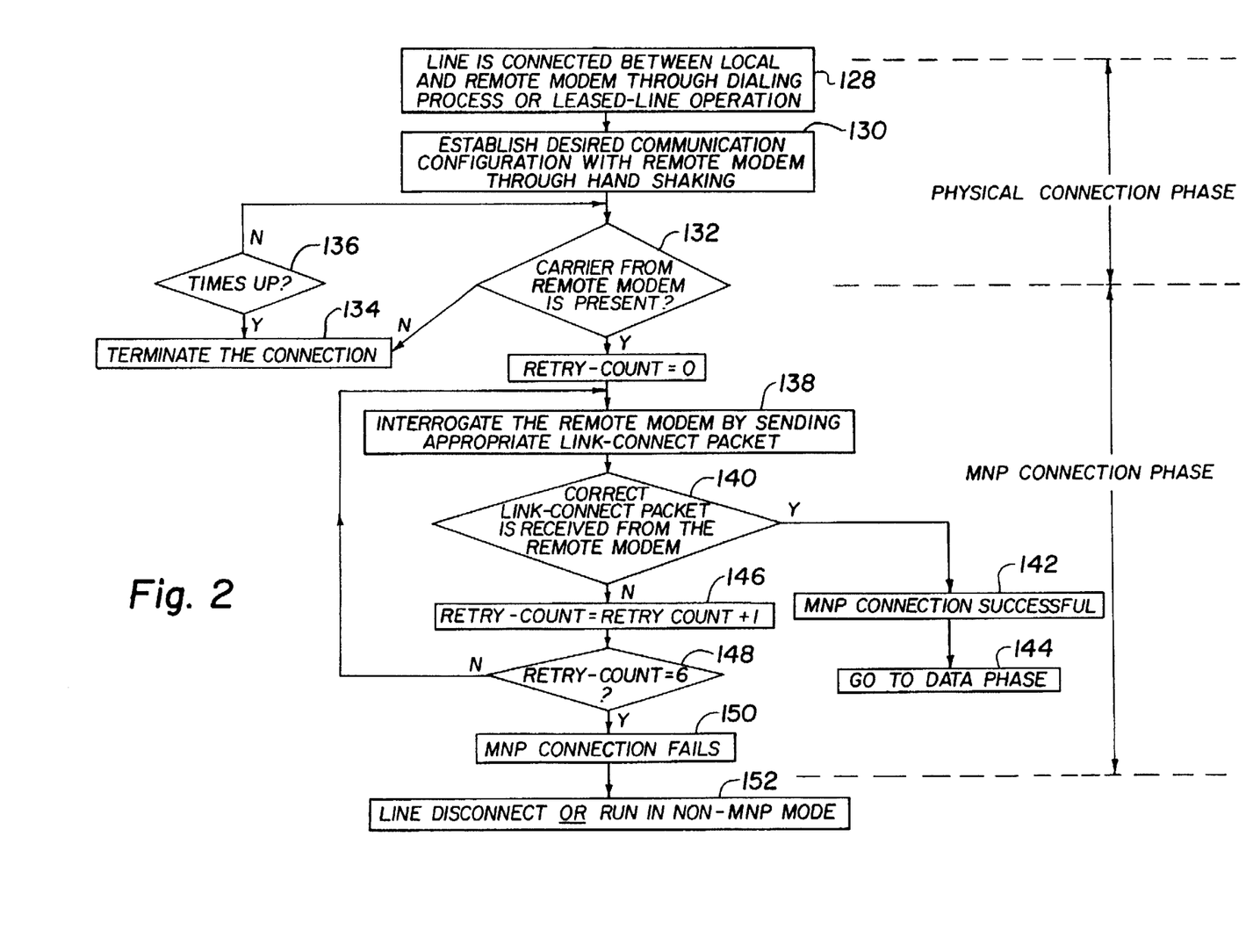
FIG. 2 is a simplified flowchart illustrating the connection phase provided by the present invention.

With reference to FIG. 2, the connection phase of the inventive protocol software, prior to the transmission of data, is disclosed.

The line, either telephone line, radio frequency, infrared, satellite system or cellular, is connected (line is connected 128) between the local and remote modem either through the dialing process or a leased-line operation. Desired communication configuration (establish desired communication 130) is established with a remote modem through handshaking. The presence of the carrier from the remote modem (carrier present 132) is determined. If the carrier is not present within a specified time (times up 136) then the connection will be terminated (terminate the connection 134) and the connection phase must be initiated again. If the carrier is not present and the specified time has not elapsed, then the presence of the carrier from the remote modem (carrier present 132) will continue until the specified time has elapsed or the presence of the carrier occurs. With the carrier being present, the remote modem is interrogated (interrogate the remote modem 138) by sending appropriate link-connect packet to the remote modem.

Figure 3:
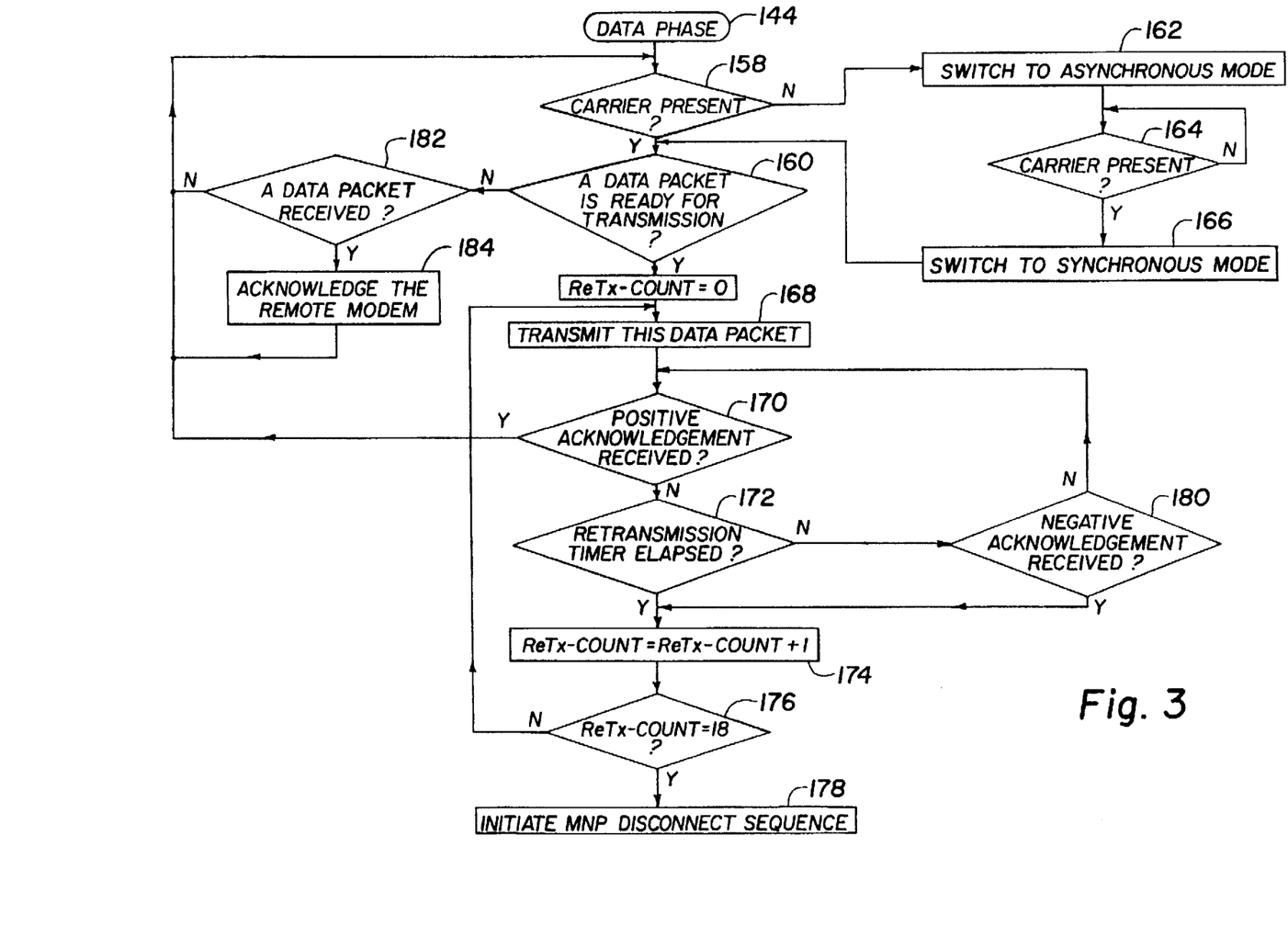
FIG. 3 is a simplified flowchart illustrating the data phase provided by the present invention.

If the correct link-connect packet 140 is received from the remote modem then the MNP with the ITC-RM connection is successful 142 and the next step is (go to data phase 144) as shown in FIG. 3. If the correct link-connect packet 140 is not received, then the correct link-connect packet 140 is repeated through the Retry-Count 146 step until successful receipt of the correct link-connect packet is received or until the Retry-Count=6 step 148 equals the count of six. At that time, the MNP with ITC-RM connection fails 150 and a line disconnect 152 or the connection phase is run in the non-MNP mode and ITC-RM.

With reference to FIG. 3, the data phase of the inventive protocol software, after the successful connection phase, is disclosed. From data phase 144, the presence of the carrier (carrier present 158) is determined. If the carrier is present, then the determination is made as to the readiness of a data packet (data packet is ready 160) for transmission. If the carrier is not present, then the modem is switched to the asynchronous mode (switch to asynchronous mode 162) and the presence of the carrier (carrier present 164) is determined. Upon the presence of a carrier, modem-controller 10 is switched to the synchronous mode (switch to synchronous mode 166) and the determination is made as to the readiness of a data packet (data packet is ready 160). Upon determination that a data packet is ready for transmission then the data packet is transmitted (transmit this data packet 168) and acknowledgement is noted (positive acknowledgement received 170). If positive acknowledgement received 170 occurs, then the cycle is back to step 158, step 160, step 168 to step 170. This cycle is repeated until transmission is complete or carrier is lost. If positive acknowledgement is not received at step 170, then a check is made to determine if the retransmission timer elapsed 172 has occurred. If it has, then the next step is to the (ReTx–count=ReTx–count+1) 174 to the step of (ReTx–count=18) 176. If the ReTx count has not reached 18, then the cycle is back to step 168 where the data packet is transmitted again until the ReTx–count=18. At that time, the MNP with ITC-RM disconnect sequence 178 disconnects the modem from the telephone line, cellular phone or radio frequency telemetry module or packet radio. Such a disconnect sequence is of the kind that is well known in the art.

If the retransmission timer elapsed 172 has not occurred, then a check is made for a negative acknowledgement received 180. If a negative acknowledgement 180 has been received, then the next step is step 174 and eventually back to step 168 (transmit this data packet). If a negative acknowledgement has not been received, then the cycle is back to step 170 (positive acknowledgement received 170) to determine if a positive acknowledgement has been received.

Whenever a positive acknowledgement is received at step 170, that yes status is sent back to step 158 to check for a carrier present 158 so another data packet may be made ready for transmission as in step 160.

When a data packet is received 182, then an acknowledgement (acknowledge the remote modem 184) is noted and the cycle is back to step 158 to start the sequence to send another data packet. If a packet is not received (acknowledge the remote modem 184), then the cycle is back to step 158.

In one arrangement, remote device 102 can be replaced by an infrared transceiver. Such an arrangement can be used on several computers within infrared range of each other to form a network. The area over which the network can operate can be expanded by elevating an infrared relay device.

Although the present invention has been described herein with reference to specific forms thereof, it is evident that many alternatives, modifications and variations will become apparent to those skilled in the art in light of the foregoing disclosure. Accordingly, this description is to be construed as illustrative only and is for the purpose of teaching those skilled in the art the manner of carrying out the invention. It is to be understood that the forms of the invention herewith shown and described are to be taken as presently preferred embodiments. Various changes may be made in the shape, size and arrangement of parts. For example, equivalent elements may be substituted for those illustrated and described herein, parts may be reversed, and certain features of the invention may be utilized independently of other features of the invention. It will be appreciated that various modifications, alternatives, variations, etc., may be made without departing from the spirit and scope of the invention as defined by the appended claims.

I claim:

1. An apparatus for transmitting data signals over a telephone landline or a cellular telephone system and for transmitting voice signals over the telephone landline or the cellular telephone system, comprising:

a modem for converting received digital signals to analog signals and for converting received analog signals to digital signals;

a data access arrangement operatively connected to said modem and including means to operatively connect to the telephone landline;

a microcontroller operatively connected to said modem;

a read-only memory operatively connected to said microcontroller;

protocol software in said read-only memory in the form of firmware for controlling the operation of the apparatus;

a cellular telephone interface for connecting said microcontroller to a control unit and a transceiver unit of the cellular telephone;

means for providing voice communications over the telephone landline or the cellular telephone system;

a first analog switch for receiving input firm said means for providing voice communications and providing outputs to said data access arrangement and said transceiver unit of said cellular telephone;

a second analog switch for receiving input from said control unit of said cellular telephone and providing outputs to said data access arrangement and said transceiver unit of said cellular telephone;

a third analog switch for receiving input from said modem and providing outputs to said data access arrangement and said transceiver unit of said cellular telephone; and means to connect data terminal equipment to said microcontroller through an interface.

2. The modem-controller of claim 1 wherein said protocol software includes means for retrying the connection phase for a total of six tries.

3. The modem-controller of claim 2 wherein said protocol software includes means for retransmitting data packets, after successful connection phase, for a total of eighteen tries.

4. The apparatus of claim 3 wherein said protocol software includes means to suspend transmission from the modem to wait for the recovery of loss of carrier.

5. The apparatus of claim 4 wherein said protocol software includes means to switch the mode of operation of said modem from synchronous to asynchronous if carrier loss occurs during transmission in the synchronous mode of operation and to switch back to the synchronous mode upon recovery of the carrier.

6. An apparatus for transmission of data signals over a telephone landline, a wireless radio frequency network or a cellular telephone system and for transmitting voice signals over the telephone landline, the wireless radio frequency network or a cellular telephone system, comprising:

a modem for converting received digital signals to analog signals and for converting received analog to digital signals;

a data access arrangement operatively connected to said modem and including a means to operatively connect to the telephone landline;

a microcontroller operatively connected to said modem;

a read-only memory operatively connected to said microcontroller;

protocol software in said read-only memory in the form of firmware for controlling the operation of the apparatus;

a cellular telephone interface for connecting said microcontroller to a cellular telephone transceiver unit;

a radio frequency interface/logic for connecting said microcontroller to a radio frequency transceiver unit;

means for providing voice communication using a microphone and speaker over a telephone landline, a wireless radio frequency network or a cellular telephone system;

a plurality of analog switches for operatively connecting said means for providing voice communications, said radio frequency transceiver, said cellular telephone to said data access arrangement; and means to connect data terminal equipment to said microcontroller through an interface.

7. The apparatus of claim 6 wherein said protocol software includes means for retrying the connection phase for a total of six tries.

8. The apparatus of claim 7 wherein said protocol software includes means for retransmitting data packets, after successful connection phase, for a total of eighteen tries.

9. The apparatus of claim 8 wherein said protocol software includes means to suspend transmission from the modem to wait for the recovery of loss of carrier.

10. The apparatus of claim 9 wherein said protocol software includes means to switch the mode of operation of said modem from synchronous to asynchronous if carrier loss occurs during transmission in the synchronous mode of operation and to switch back to the synchronous mode upon recovery of the carrier.

11. An apparatus for transmission of data signals over ordinary telephone line service, radio frequency network or a cellular telephone system and for transmitting voice signals over the telephone line service, the radio frequency network and the cellular telephone system, comprising:

a modem for converting received digital signals to analog signals and for converting received analog to digital signals;

a data access arrangement operatively connected to said modem and including a means to operatively connect to a telephone line;

a microcontroller operatively connected to said modem;

a read-only memory operatively connected to said microcontroller;

protocol software in said read-only memory in the form of firmware for controlling the operation of the apparatus;

a cellular telephone interface for connecting said microcontroller to a cellular telephone unit;

radio frequency interface/logic for connecting said microcontroller to radio frequency telemetry modules or packet radios;

means for providing voice communication using a microphone and speaker over the telephone line, the wireless radio frequency network or the cellular telephone system;

a plurality of analog switches for receiving inputs from said means for providing voice communications, said radio frequency telemetry modules or packet radios, said cellular telephone, said data access arrangement and said modem and providing outputs to said modem, said data access arrangement, said radio frequency telemetry modules or packet radios, and said cellular telephone; and means to connect data terminal equipment to said microcontroller through an interface.

12. The modem-controller of claim 11 wherein said protocol software includes means for retrying the connection phase for a total of six tries.

13. The modem-controller of claim 12 wherein said protocol software includes means for retransmitting data packets, after successful connection phase, for a total of eighteen tries.

14. The apparatus of claim 13 wherein said protocol software includes means to suspend transmission from the modem to wait for the recovery of loss of carrier.

15. The apparatus of claim 14 wherein said protocol software includes means to switch the mode of operation of said modem from synchronous to asynchronous if carrier loss occurs during transmission in the synchronous mode of operation and to switch back to the synchronous mode upon recovery of the carrier.

16. An apparatus for transmission of standard or fax data signals over ordinary telephone line service, radio frequency network, satellite system or a cellular telephone system and for transmitting voice signals over the telephone line service, the radio frequency network, the satellite system and the cellular telephone system, comprising:

a modem for converting received digital signals to analog signals and for converting received analog to digital signals;

a data access arrangement operatively connected to said modem and including a means for operatively connecting to a telephone line;

a microcontroller operatively connected to said modem;

a read-only memory operatively connected to said microcontroller;

protocol software in said read-only memory in the form of firmware for controlling the operation of the apparatus;

a cellular telephone interface for connecting said microcontroller to a cellular telephone unit;

a radio frequency interface for connecting said microcontroller to a radio frequency telemetry module or packet radio unit;

means for providing voice communication using a microphone and speaker over the telephone line, the wireless radio frequency network, the satellite system or the cellular telephone system;

a plurality of analog switches controlled by said microprocessor to control input and output of said means for providing voice communications or said modem to said radio frequency interface and to said data access arrangement to said cellular telephone means, said satellite system and a remote device or infrared transceiver.

17. The modem-controller of claim 16 wherein said protocol software includes means for retrying the connection phase for a total of six tries.

18. The modem-controller of claim 17 wherein said protocol software includes means for retransmitting data packets, after successful connection phase, for a total of eighteen tries.

19. The apparatus of claim 18 wherein said protocol software includes means to suspend transmission from the modem to wait for the recovery of loss of carrier.

20. The apparatus of claim 19 wherein said protocol software includes means to switch the mode of operation of said modem from synchronous to asynchronous if carrier loss occurs during transmission in the synchronous mode of operation and to switch back to the synchronous mode upon recovery of the carrier.

21. The apparatus of claim 11 wherein the plurality of analog switches comprises in combination:

a first analog switch for receiving input from said means for providing voice communications or said modem and providing outputs to second analog switch;

a second analog switch for receiving input from first analog switch and providing outputs to said data access arrangement or radio frequency interface/logic;

a third analog switch for receiving input from said data access arrangement and providing outputs to said cellular telephone interface to said cellular telephone;

a fourth analog switch for receiving input from said data access arrangement and providing outputs to said telephone line; and a fifth analog switch for receiving input from telephone line and providing outputs to said cellular telephone interface to said cellular telephone.

22. The apparatus of claim 16 wherein the plurality of analog switches comprises in combination:

a first analog switch for receiving input from said microcontroller to control signal path from said means for providing voice communications or said modem to said radio frequency or said data access arrangement;

a second analog switch for receiving input from said microcontroller to control signal path from said first analog switch to said radio frequency interface or said data access arrangement;

a third analog switch for receiving input from said microcontroller to control signal path from said data access arrangement to said cellular telephone interface to said cellular telephone;

a fourth analog switch for receiving input from said microcontroller to control signal path from said data access arrangement to said remote device or infrared transceiver through said telephone line or to said satellite system; and a fifth analog switch for receiving input from said microcontroller to control signal path from said remote device or infrared transceiver via said telephone line connected to said cellular telephone interface to said cellular telephone.

* * * * *